Figure 1:
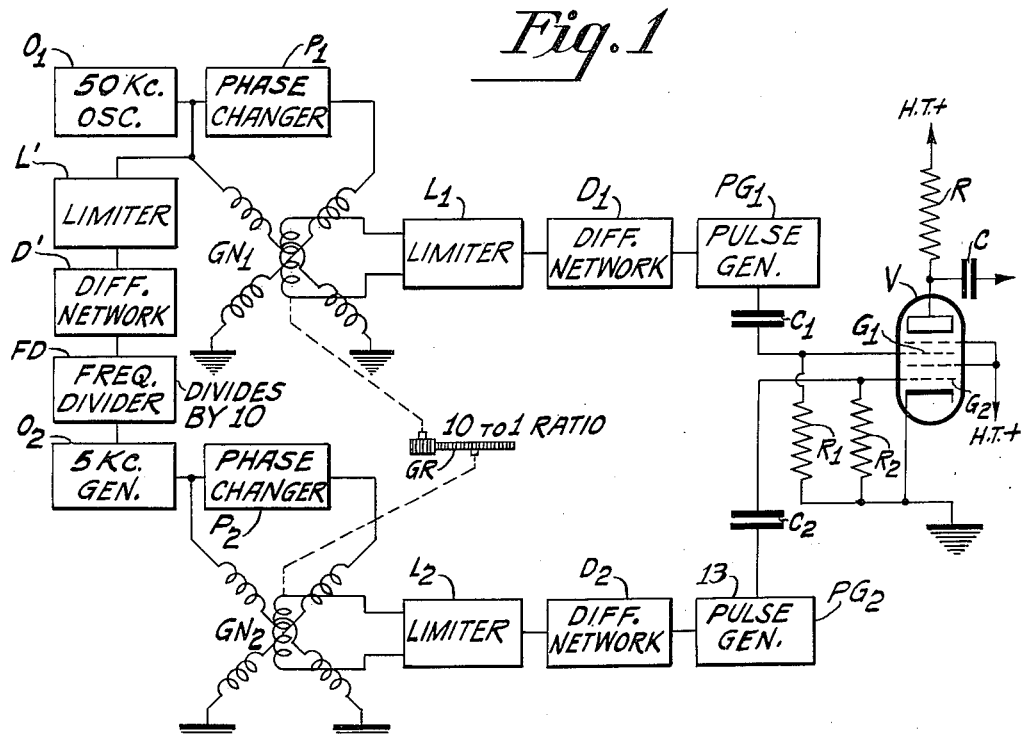

A. D. Blumlein, Dec'd.
By Doreen Walker, Ex'trix.
& Eric Lawrence Casling White
By J. L. Whittaker
ATTORNEY Patented Feb. 19, 1952

2,586,605

UNITED STATES PATENT OFFICE 2,586,605

METHODS AND APPARATUS FOR THE CONTROL OF THE TIMING OF RECURRENT SIGNALS

Alan Dower Blumlein, deceased, late of London, England, by Doreen Walker, executrix, Paignton, England, and Eric Lawrence Casling White, Iver, England, assignors to Electric & Musical Industries Limited, a British company Original application January 11, 1946, Serial No. 640,596. Divided and this application April 30, 1949, Serial No. 90,724. In Great Britain December 13, 1939

9 Claims. (Cl. 250—27)

This application is a division of application Serial No. 640,596, filed January 11, 1946, in the names of A. D. Blumlein and E. L. C. White, and entitled Improvements in or Relating to Methods and Apparatus for the Control of the Timing of Recurrent Signals.

This invention relates to apparatus for the control of the timing of recurrent signals.

Methods are already known by which the phase of electrical signals may be adjusted, for example, by rotating the moving coil of a goniometer of which the two fixed pairs of coils are fed with the signal in quadrature. In such arrangements, the phase of signals obtained from the moving coil of the goniometer will be determined by the angular position of this coil. Although the angular position of the coil may be accurately measured by gearing the motion of the coil to an indicating device, trains of gearing have backlash which limit the final accuracy obtainable. Further, the phase of the signals may not be directly proportional to the angular position of the coil due to imperfections in the goniometer. Such methods therefore require apparatus of very careful design and construction to enable the phase of the signals to be adjusted with accuracy.

It is an object of this invention to provide improved apparatus of relatively simple design and construction for the accurate control of the timing of recurrent electrical pulses.

Broadly, according to the present invention, apparatus for generating a series of electrical pulses of adjustable timing includes means providing a plurality of series of signals, the signals in each series being recurrent at a frequency which is an integral multple of the frequency of the signals in the next series of lower frequency and having a duration which is shorter than that of the signals in said next series, the lowest frequency being that of the pulses which it is desired to generate, means arranged to generate an output pulse only when signals from each of said series are simultaneously applied to said means and means for controlling the timing of said series of signals in such a manner that whenever a signal of the lowest frequency is applied to said generating means, an appropriate signal from each other series of signals, depending on the relative frequency of said series of signals, is simultaneously applied to said generating means whereby the timing of the generated pulses is determined by the timing of the series of signals of highest frequency so that the timing of the generated pulses may be adjusted to the same accuracy as that of said signals of highest frequency.

In the case in which two series of signals are employed, apparatus according to the invention includes a first source providing a first series of signals recurrent at a frequency $f$, means for controlling the timing of said series of signals, a second source providing a second series of signals of shorter duration and recurrent at a frequency $nf$, where $n$ is an integer, means for controlling the timing of said second series of signals, a device arranged to generate an output pulse only when signals of said first and second series are fed to it simultaneously, said first and second controlling means being so inter-connected that every $n$th signal of said second series is always fed to said device during a signal of the first series, whereby the timing of the generated pulses is determined by the timing of said second series of signals so that the timing of the generated pulses may be adjusted to the same accuracy as said second series of signals.

Preferably, where three series of signals are employed, apparatus according to the invention comprises a source providing a third series of signals of shorter duration than said second series of signals and recurrent at a frequency $mnf$, where $m$ is an integer, means for controlling the timing of said third series of signals, a second device arranged to provide an output only when the output from said first-mentioned device and said third series of signals are fed to it simultaneously, said third controlling means being interconnected with said first and second controlling means, so that every $m$th signal of said third series occurs during a signal of said second series, whereby the timing of the generated pulses may be adjusted to the same accuracy as the timing of said third series of signals.

The signals of frequency $nf$ or $nmf$ may be provided by an oscillation generator and one or more frequency dividers are arranged to provide the signals of frequency $f$ or $nf$ and $f$, respectively.

In particular forms of apparatus embodying the invention, the means for controlling the timing of the series of signals includes an angularly adjustable element so arranged that the timing of said signals is linearly related to the angular rotation of said element and one of said elements is coupled to another of said elements which controls the timing of a series of signals of lower frequency by reduction gearing of predetermined ratio, so that when said elements are adjusted a signal of the series of higher frequency always occurs during a signal of the series of lower frequency. Particular forms of means for controlling the timing of the signals may consist of one or more goniometers, one or more delay networks having variable tappings to permit adjustment of the timing of signals applied to them, capacitatively coupled goniometers or a sawtooth voltage waveform generator the frequency of which is controlled by pulses and a valve to which the sawtooth wave form is applied, an angularly adjustable member serving to control a bias potential which is applied to the valve so as to control the timing at which the sawtooth waveform causes the valve to conduct to produce an output.

The means arranged to generate an output pulse or the device or second device to which the separate series of signals are applied may consist of a thermionic valve having two control electrodes to each of which a series of signals of different frequency is fed, said valve being so arranged as only to give an output when signals are simultaneously applied to both of said grids.

Figure 2:
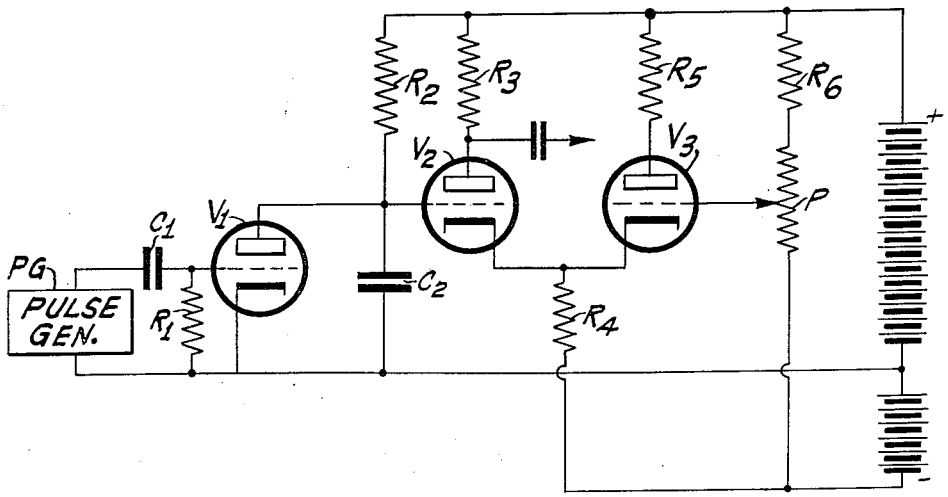
Figure 3:
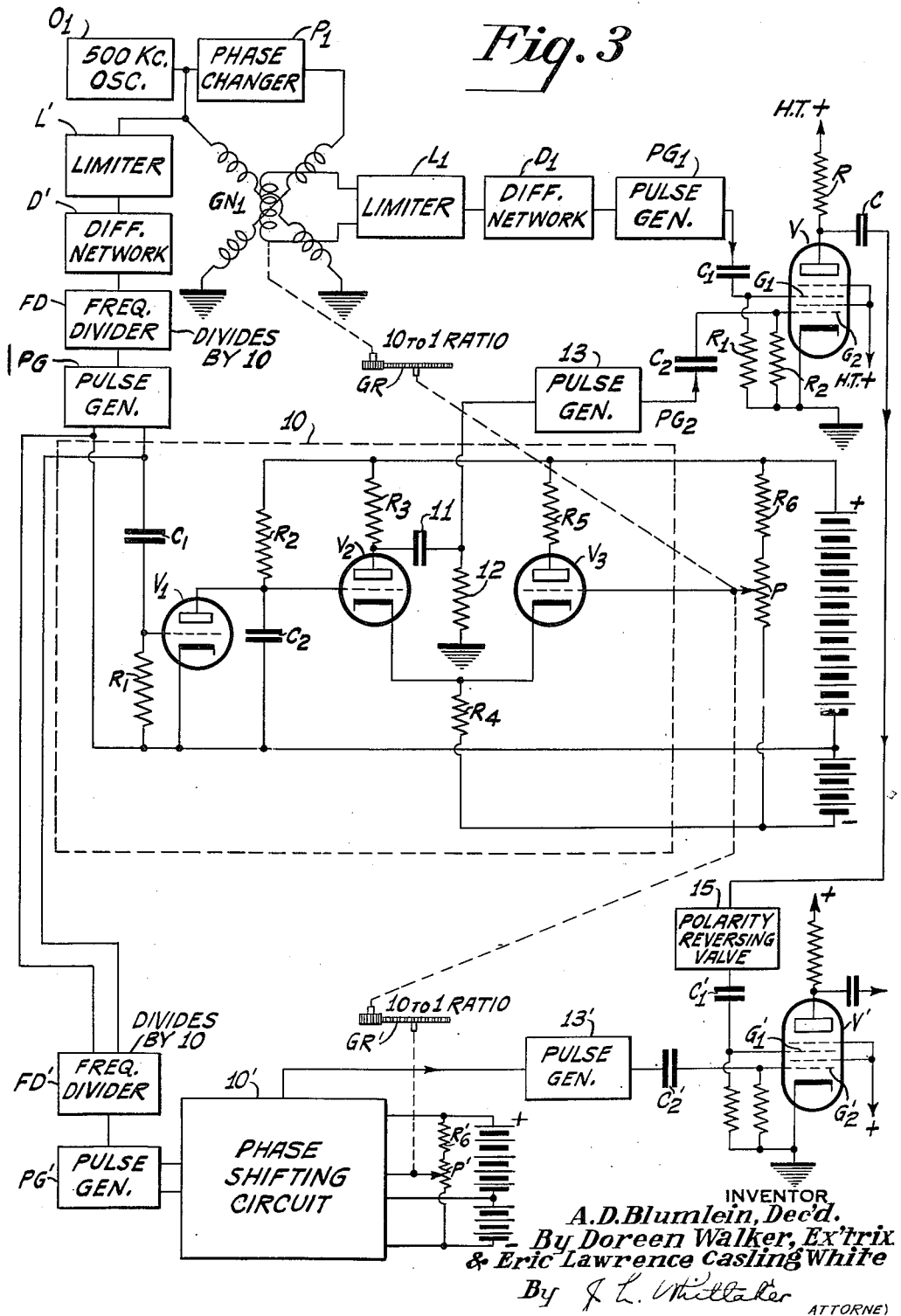

In order that the invention may be more clearly understood and readily carried into effect, alternative forms of pulse timing circuit arrangements will now be described in greater detail by way of example with reference to the accompanying drawings, in which:

Figure 1 shows a general schematic circuit diagram of an arrangement for the accurate control of the timing of pulses by means of goniometers, Figure 2 shows a circuit diagram of an alternative pulse generator of adjustable timing, and Figure 3 shows a block and circuit diagram of an embodiment of the invention that includes the circuit of Figure 2 for the accurate control of the timing of pulses.

In the several figures similar parts are indicated by similar reference characters.

Referring to Figure 1, it will be seen that the circuit comprises a valve V, from the anode circuit of which recurrent pulses are obtained, and the goniometers $GN_1$, $GN_2$ which control the timing of these pulses by controlling the timing of a first series of pulses of frequency $f$ and the second series of pulses of frequency $nf$ derived from the oscillators $O_2$ and $O_1$, respectively, in a manner which will hereinafter be described.

It will be assumed that the oscillator $O_1$ is an oscillator generating sinusoidal oscillations at 50,000 cycles/sec. The output from the oscillator $O_1$ is fed to one pair of coils of the goniometer $GN_1$ and is also fed via a phase-changing device $P_1$ of known type which rotates the phase of the oscillations by 90° to the other pair of coils of the goniometer $GN_1$. The output from the moving coil of $GN_1$ is fed to the limiting device $L_1$, which converts the sinusoidal oscillations into an oscillation of substantially rectangular waveform $L_1$ and may conveniently take the form of a thermionic valve amplifier adjusted in well known manner to limit both positive and negative amplitudes of the applied oscillations. The output from $L_1$ is applied to the differentiating network $D_1$ of known type, which may, for example, comprise a condenser in series with a resistance, which converts the limited sinusoidal oscillations into a series of sharp impulses of relatively short duration. These impulses may be utilized directly, or may be fed to a pulse generator $PG_1$, which may be a multivibrator of known type, to cause it to generate pulses of short duration at the frequency of the oscillator $O_1$, these pulses of short duration being the second series of pulses of frequency $nf$ referred to above. The pulses thus generated by the pulse generator $PG_1$ are fed in the positive sense to the grid $G_1$ of the hexode valve V over an A. C. coupling comprising a condenser $C_1$ and leak $R_1$ the grid $G_1$ being biased beyond anode current cut-off except when a pulse from the pulse generator $PG_1$ is applied thereto.

The oscillations from the oscillator $O_1$ are also fed via a limiter $L'$ and a differentiating network $D'$ similar to the limiter $L_1$ and the differentiating network $D_1$, respectively, to a frequency divider FD of known type, which may be of the kind described in British Patent Specification No. 471,731. The frequency divider FD is arranged to deliver pulses of a frequency of $\frac{1}{10}$ of that of the oscillator $O_1$, namely, 5000 cycles/sec. and these pulses are applied to control a device $O_2$, which may be a tuned circuit or a band-pass filter, so as to provide a sinusoidal output having a frequency of 5000 cycles/sec.

The sinusoidal oscillations from the device $O_2$ are then treated in the manner which has previously been described with reference to the oscillator $O_1$. They are fed in quadrature to the coils of the goniometer $GN_2$, and the output from the moving coil of this goniometer is fed via the limiter $L_2$ and the differentiating network $D_2$ which corresponds to the limiter $L_1$ and the differentiating network $D_1$ to the pulse generator $PG_2$ and thence to the control electrode $G_2$ of the valve V over the grid condenser $C_2$ and its associated leak $R_2$. The pulse generator $PG_2$ is, however, arranged to provide pulses longer in duration than those provided by the pulse generator $PG_1$ and these pulses constitute the first series of pulses of frequency $f$ referred to above. The control grid $G_2$ is arranged to be normally biased beyond anode current cut-off so that the valve V can only pass current when pulses from the pulse generator $PG_2$ are present.

The valve V is provided with two further electrodes which are connected to steady positive potentials so as to enable them to serve as screening electrodes, and its anode circuit is provided with an output load R. In operation, it is arranged that a voltage is set up across the load R only when pulses are simultaneously present on the control electrodes $G_1$ and $G_2$, and the voltages thus set up constitute the series of pulses the timing of which is to be controlled and may be fed to a utilization circuit through a blocking condenser C.

The fixed coils of the goniometers $GN_1$ and $GN_2$ are adjusted so that whenever a pulse from the pulse generator $PG_2$ is applied to the control electrode $G_2$, a pulse from the pulse generator $PG_1$ is also applied to the control electrode $G_1$ at approximately the mean or average timing of the pulse from the pulse generator $PG_2$. The duration of the pulse from the pulse generator $PG_2$ is arranged to be nearly equal to the time interval between successive pulses from the pulse generator $PG_1$, so that the maximum error in timing of the pulses from the pulse generator $PG_2$ may be tolerated whilst still ensuring that these pulses shall coincide in a particular case only with every 10th pulse from the pulse generator $PG_1$. The output from the anode circuit of the valve V will therefore be a series of pulses having the duration of the pulses from the pulse generator $PG_1$ but recurrent at the frequency of the pulses from the pulse generator $PG_2$.

The adjustment of the timing of the pulses in the output circuit of the valve V will now be described. This adjustment is effected by rotating the moving coil of the goniometer $GN_1$ and simultaneously rotating the moving coil of the goniometer $GN_2$ so as to maintain the timing of the pulses delivered by the pulse generators $PG_1$ and $PG_2$ within the tolerance permitted by the difference in duration of these pulses, i. e., within approximately the time interval between successive pulses from the pulse generator $PG_1$, so as to ensure that no "slipping" can occur due to a pulse other than every successive pulse selected from the pulses provided by the pulse generator $PG_1$. The moving coil of the goniometer $GN_2$, in the particular case under consideration may conveniently be driven from the moving coil of the goniometer $GN_1$ by a 10:1 reduction gearing indicated at GR, and in view of the relatively large permissible tolerance in the timing of the pulses derived from the goniometer $GN_2$, it will be appreciated that this gearing need not be highly accurate, but may be relatively cheap, since the presence of considerable backlash may be permitted. Further, the effect of departure of the phase angle of the output of the goniometer $GN_1$ from a strictly linear relation to the angle of rotation of the moving coil will be greatly reduced so far as the timing of the output pulses from V are concerned. It will thus be seen that the timing of the 5000 cycles/sec. pulses from V may be adjusted with an accuracy equal to the obtainable for the pulses of 50,000 cycles/sec., i. e., the accuracy of timing adjustment has been increased approximately tenfold by a method which does not require precision gearing or goniometers of highly accurate design.

The method which has been described may be applied two or more times so as to gather further increased accuracy of timing adjustment. Thus, if the frequency of the required pulses is 5000 cycles/sec. an oscillator having a frequency of 500,000 cycles/sec. may be provided, and successively divided to give oscillations at frequencies of 50,000 cycles/sec. and 5,000 cycles/sec., respectively. These three oscillations may then be applied in quadrature to the fixed coils of three goniometers and the moving coils of these goniometers coupled together in succession over 10:1 reduction gearing so that an angular movement of 100° of the moving coil of the goniometer fed with the 500,000 cycles/sec. oscillation causes an angular movement of 10° of the moving coil of the goniometer fed with the 50,000 cycles/sec. oscillation which in turn causes an angular movement of 1° of the moving coil of the third goniometer. The outputs from the moving coils of the first two goniometers are then treated in the same manner as that described above with reference to the goniometers $GN_1$ and $GN_2$, and the output from a hexode valve corresponding to the valve V is then fed via an amplifying valve which reverses its polarity, to one of the control electrodes of another hexode valve similarly arranged, to the other control electrode of which the pulses derived from the third goniometer are applied after passing through further devices corresponding to the limiter $L_1$, the differentiating network $D_1$ and the pulse generator $PG_1$. The pulses derived from the output circuit of this further hexode will thus have the duration of the highest frequency pulses, but will recur at the lowest frequency, i. e., 5000 cycles/sec. and the accuracy with which their timing may be adjusted will be the accuracy with which the highest frequency pulses may be adjusted. In other words, the accuracy of timing has been increased approximately 100 times.

The inductive goniometers, which have been referred to in the preceding description, may be replaced by capacity goniometers of known type having two pairs of fixed plates arranged in the manner of a quadrant electrometer so as to enclose a circular output electrode. A screening electrode is arranged to rotate between said circular electrode and said pairs of fixed plates so as to vary the direct capacity between each pair of fixed plates and said circular plate, and the phase of the signals derived from said circular electrode is then determined by the angular position of said screening electrode.

Alternatively, said goniometers may be replaced by time delay networks giving delay equal to the periodic time of the pulses of which the timing is to be adjusted. Such networks are preferably folded or looped so as to bring their ends adjacent each other, and are terminated so as to prevent reflections. The timing of the pulses is adjusted by rotating an arm carrying a pick-up electrode so that it either makes contact or has capacity to different points in the network in turn. By folding the network so as to make it of substantially circular form and to bring its ends adjacent to each other, the pick-up electrode may be rotated beyond 360° and the timing of the pulses made proportional to the angular rotation of the arm carrying the pick-up electrode. If the frequency of the pulses is sufficiently high to permit capacitative pick-up, a second time-delay network similar to that which has been described may be set up so as to be rotatable with reference to it, so that any given point in the second delay network is capacitatively coupled with successive points in the first delay network as the two networks are rotated with respect to each other. The timing of the pulses delivered at the ends of the second delay network will then depend upon the relative angular position of the time networks, and may be continuously adjusted by rotating the two networks with respect to each other.

It will be appreciated that it is unnecessary to employ sinusoidal oscillations when time delay networks are used instead of goniometers, since the former are suitable for controlling the timing of pulses whereas the latter can only be used satisfactorily with sinusoidal oscillations. Thus, if time delay networks are used, the limiters and differentiating networks $L'$, $D'$, $L_1$, $D_1$, etc., are not required, and the oscillators $O_1$, $O_2$, etc., take the form of pulse generators.

A further alternative to the above-mentioned goniometers and time delay networks will now be described with reference to Figure 2 of the accompanying drawings. The pulse generator PG supplies the pulses, the timing of which is to be controlled, to the control electrode of the valve $V_1$ over a condenser $C_1$ and leak $R_1$, which are arranged so that the grid current drawn by the pulses biases the valve $V_1$ beyond anode current cut-off except when pulses are present. The valve $V_1$ is thus normally nonconducting, but is rendered conductive whenever a pulse is applied to its control electrode. The anode/cathode path of the valve $V_1$ is connected in parallel with the condenser $C_2$, which is connected in series with resistance $R_2$ across a source of voltage as shown. Current flows from this source of voltage through the resistance $R_2$ to charge the condenser $C_2$ until the valve $V_1$ is rendered conductive by a pulse from the pulse generator PG, when the condenser $C_2$ is discharged through the valve $V_1$. On the termination of the pulse from the pulse generator PG the valve $V_1$ becomes non-conducting and the condenser again commences to charge and so the cycle repeats itself. The voltage set up across the condenser $C_2$ is thus of approximately saw-tooth form and has a frequency equal to that of the pulses from the pulse generator PG. The voltage set up across the condenser $C_2$ is applied to the control electrode of a valve $V_2$, which has a resistance $R_3$ in its anode circuit and a resistance $R_4$ in its cathode circuit. A further valve $V_3$ also shares the cathode resistance $R_4$ and has a resistance $R_5$ in its anode circuit. The control electrode of $V_3$ is connected to a sliding contact on a potentiometer P connected in series with a fixed resistance $R_6$ across a source of voltage as shown. As previously indicated, the angularly adjustable member (the sliding contact on potentiometer P) serves to control a bias potential which is applied to the valve $V_2$ to which the sawtooth wave form is applied so as to control the timing at which the sawtooth wave form causes the valve $V_2$ to conduct to produce an output. As the voltage across the condenser $C_2$ increases, assuming this voltage has reached a value sufficient to make both valves $V_2$ and $V_3$ conducting, the current in the anode circuit of both valves $V_2$ and $V_3$ will change, the current in the valve $V_2$ will increase and the current in the valve $V_3$ will decrease. When the condenser $C_2$ is discharged by the valve $V_1$, an opposite change in these currents will take place. By feeding the voltage set up across either the resistance $R_3$ or $R_5$ to a differentiating network, a series of pulses may be obtained having the same frequency as the pulses delivered by the pulse generator PG but having a timing dependent upon the position of the slider of the potentiometer P. The pulses thus derived from the resistance $R_3$ or $R_5$ may control a further pulse generator giving pulses of any desired duration and may then be applied to one of the control electrodes of a hexode mixer of the type described with reference to Figure 1 of the accompanying drawings.

As illustrated in Figure 3, in order to enable the timing of the pulses derived from the arrangement shown in Figure 2 to be controlled simultaneously with that of other pulse generators the slider of the potentiometer P may be mechanically coupled either to the sliders of other potentiometers controlling the other pulse generators or to the moving coil of a goniometer or to the rotating pick-up element of a time delay network. As the condenser $C_2$ will charge exponentially, the potentiometer P is preferably given an exponential law so that the timing of the pulses may have a linear relation to the movement of the slider of this potentiometer. Alternatively, the condenser $C_2$ may be arranged to charge linearly by connecting a large choke in series with the resistance $R_2$ in which case the potentiometer may have a linear law. Generally speaking, the pulse generator shown in Figure 2 is convenient for the low frequency pulse, and goniometers or time delay networks are more suitable for the higher frequency pulses, the timing of which has to be capable of continuous adjustment through many cycles, thus requiring more than 360° of rotation of the timing adjustment.

In Figure 3, there is shown, by way of example, three geared phase shifting circuits, one being of the goniometer type and the other two being of the type shown in Figure 2. The greater part of the circuit corresponding to that of Figure 2 is shown enclosed by a broken line rectangle 10. The capacitor 10 and resistor 12 differentiate the sawtooth wave taken off the anode of the valve $V_2$ to obtain a rectangular wave that is applied to a suitable pulse generator 13. The generator 13 is triggered by the front edge of the rectangular wave to produce pulses having a suitable width or duration and having a timing determined by said front edge.

If desired, a second circuit of the type shown in Figure 2 may be included in the system as indicated by the block 10'. The circuit elements or units associated with the block 10' correspond to those associated with block 10 and are provided with the same reference characters with a prime added.

The valve V' functions the same as valve V and has the output pulses of valve V applied to grid $G_1'$ by way of a polarity reversing valve 15. The pulses from pulse generator 13' are applied to the grid $G_2'$.

What is claimed is:

1. In combination, a sine wave oscillator, a chain of frequency divider units connected to divide the frequency of said oscillator output, said divider units being of the type that produces a pulse output, means for converting said pulse outputs to sawtooth wave outputs, a plurality of clipping tubes to which said sawtooth wave outputs, respectively, are supplied, variable bias means for changing the clipping level of said clipping tubes, means for differentiating the output pulses of said clipping tubes whereby pulses are produced that are delayed with respect to the output pulses of said divider units as a function of said clipping levels, means for gearing said variable bias means together and for connecting them to a driving means whereby the clipping levels of said clipping tubes are changed simultaneously when said driving means is operated, the gear ratios between successive variable bias means being proportional to the frequency of the outputs of the divider units supplying signal to the clipping tubes controlled by said several variable bias means, respectively, and a pulse selector to which said delayed pulses are supplied.

2. In combination, a master oscillator, a chain of frequency divider units connected to divide the frequency of said oscillator output, said divider units being of the type that produces a pulse output, means for converting said pulse outputs to sawtooth wave outputs, a plurality of clipping tubes to which said sawtooth wave outputs, respectively, are supplied, variable bias means for changing the clipping level of said clipping tubes over a range from substantially the top of said sawtooth wave to substantially the bottom of said sawtooth wave, means for differentiating the output pulses of said clipping tubes whereby pulses are produced that are delayed with respect to the output pulses of said divider units as a function of said clipping levels, means for gearing said variable bias means together and for connecting them to a driving means whereby the clipping levels of said clipping tubes are changed simultaneously when said driving means is operated, said gear ratios corresponding to the amount of frequency division in the corresponding divider units, and a pulse selector to which said delayed pulses are supplied.

3. In combination, a source of sine waves, a frequency divider unit connected to divide the frequency of said sine waves to produce submultiple frequency waves, means for converting said submultiple frequency waves to a sawtooth wave output, a clipping tube to which said sawtooth wave output is supplied, variable bias means for changing the clipping level of said clipping tube, means for differentiating the output waves of said clipping tube whereby pulses are produced that are delayed with respect to said submultiple frequency waves as a function of said clipping level, a goniometer type phase shifter to which sine waves from said source are supplied, means for gearing said goniometer phase shifter and said variable bias means together whereby the clipping level of said clipping tube is changed simultaneously with a change in adjustment of said goniometer phase shifter, the gear ratio of said gearing means being the same as the amount of frequency division by said divider unit, and a pulse selector circuit to which the delayed pulses from said differentiating means and the signal from said goniometer phase shifter are supplied.

4. In combination, a sine wave oscillator, means including a frequency divider unit connected to divide the frequency of said oscillator output and to produce a pulse output, means for converting said pulse output to a sawtooth wave output, a clipping tube to which said sawtooth wave output is supplied, variable bias means for changing the clipping level of said clipping tube, means for differentiating the output pulses of said clipping tube whereby pulses are produced that are delayed with respect to the output pulses of said divider unit as a function of said clipping level, a goniometer type phase shifter to which signal from said oscillator is supplied, means for gearing said goniometer phase shifter and said variable bias means together whereby the clipping level of said clipping tube is changed simultaneously with a change in adjustment of said goniometer phase shifter, the gear ratio of said gearing means being the same as the amount of frequency division by said divider unit, and a pulse selector circuit to which the delayed pulses from said differentiating means and the signal from said goniometer phase shifter are supplied.

5. In combination, a master oscillator, a chain of frequency dividers connected to divide the frequency of said oscillator output, said chain of dividers comprising at least a first frequency divider unit and a second frequency divider unit, sawtooth wave generators to which the output pulses of said divider units, respectively, are applied for causing said generators to produce sawtooth waves, clipping circuits to which the outputs of said generators, respectively, are applied, each of said clipping circuits including a variable clipping level control means for changing the level at which said sawtooth waves are clipped, means for adjusting the clipping level control means of said clipping circuits simultaneously and at a rate proportional to the repetition rates of the waves applied to said clipping circuits, and means for deriving pulses from the outputs of said clipping circuits which pulses are delayed as a function of said clipping level.

6. In combination, a master oscillator, a chain of frequency dividers connected to divide the frequency of said oscillator output, said chain of dividers comprising at least a first frequency divider unit and a second frequency divider unit, sawtooth wave generators to which the output pulses of said divider units, respectively, are applied for causing said generators to produce sawtooth waves, clipping circuits to which the outputs of said generators, respectively, are applied, each of said clipping circuits including a variable clipping level control means for changing the level at which said sawtooth waves are clipped, means for adjusting the clipping level control means of said clipping circuits simultaneously and at the rate proportional to the repetition rates of the waves applied to said clipping circuits, means for deriving pulses from the outputs of said clipping circuits which pulses are delayed as a function of said clipping level, and a pulse selector to which said delayed pulses and output signal from said master oscillator are applied.

7. Apparatus for generating a series of electrical pulses of adjustable timing, including a first source providing a first series of signals recurrent at a frequency $f$, means for controlling the timing of said series of signals, a second source providing a second series of signals of shorter duration and recurrent at a frequency $nf$, where $n$ is an integer, means for controlling the timing of said second series of signals, a device arranged to generate an output pulse only when signals of said first and second series are fed to it simultaneously, said first and second controlling means being so inter-connected that every $n$th signal of said second series is always fed to said device during a signal of the first series, whereby the timing of the generated pulses is determined by the timing of said second series of signals so that the timing of the generated pulses may be adjusted to the same accuracy as that of said second series of signals, and wherein each of said means for controlling the timing of said series of signals includes an angularly adjustable element so arranged that the timing of said signals is linearly related to the angular rotation of said element and one of said elements is coupled to another of said elements, which controls the timing of a series of signals of lower frequency by reduction gearing of predetermined ratio, so that when said elements are adjusted a signal of the series of higher frequency always occurs during a signal of the series of lower frequency, and wherein at least one of said means for controlling the timing of said signals includes a sawtooth voltage waveform generator, the frequency of which is controlled by pulses and a valve to which said sawtooth waveform is applied, and means including an angularly adjustable member controlling an adjustable bias potential which is applied to said valve so as to control the timing at which said sawtooth waveform causes said valve to conduct and so to produce an output.

8. In combination, means for producing a sawtooth wave, a pair of vacuum tubes each having a cathode, a grid and an anode, an anode voltage supply, means for applying said sawtooth wave to the grid of the first one of said tubes, a cathode resistor common to said cathodes and through which said cathodes are connected to the low voltage end of said anode voltage supply, an anode resistor for the first one of said tubes through which the high voltage end of said supply is connected to the anode of said one tube, said high voltage end also being connected to the anode of the other tube, means for taking a sawtooth wave output off the anode end of said anode resistor, means for applying a bias voltage to the grid of the second one of said tubes, means for varying said bias whereby the starting time of said output sawtooth wave is varied, and a differentiating circuit to which said output sawtooth wave is applied whereby there is obtained a rectangular wave having a front edge that has a timing determined by the value of said bias.

9. In combination, means for producing a sawtooth wave, a first vacuum tube and a second vacuum tube each having a cathode, a grid and an anode, an anode voltage supply, means for applying said sawtooth wave to the grid of said first tube, a cathode resistor common to said cathodes and through which said cathodes are connected to the low voltage end of said anode voltage supply, an anode resistor for one of said tubes through which the high voltage end of said supply is connected to the anode of said one tube, said high voltage end also being connected to the anode of the other tube, means for taking a sawtooth wave output off the anode of said one tube, means for applying a bias voltage to the grid of said second tube, and means for varying said bias whereby the starting time of said output sawtooth wave is varied.

DOREEN WALKER,
*Executrix of the Estate of Allan Dower Blumlein, Deceased.*
ERIC LAWRENCE CASLING WHITE.

REFERENCES CITED

The following references are of record in the file of this patent:

UNITED STATES PATENTS

| Number | Name | Date |
| --- | --- | --- |
| 2,419,546 | Grieg | Apr. 29, 1947 |
| 2,422,205 | Meacham | June 17, 1947 |
| 2,466,044 | Schoenfeld | Apr. 5, 1949 |
| 2,471,268 | Gaines | May 24, 1949 |